United States Patent [19]
Glaser

[11] Patent Number: 5,486,433
[45] Date of Patent: Jan. 23, 1996

[54] BUTTON CELL

[75] Inventor: Helmut F. Glaser, Singapore, Singapore

[73] Assignee: Varta Batterie Aktiengesellschaft, Hanover, Germany

[21] Appl. No.: 191,955

[22] Filed: Feb. 4, 1994

[30] Foreign Application Priority Data

Feb. 24, 1993 [DE] Germany .......................... 43 05 561.3

[51] Int. Cl.⁶ .............................. H01M 2/02; H01M 6/08
[52] U.S. Cl. .............................. 429/164; 429/56; 429/241; 29/623.1
[58] Field of Search .............................. 429/209, 56, 241, 429/242, 59, 164; 29/623.1

[56] References Cited

U.S. PATENT DOCUMENTS 3,121,029  2/1964  Duddy ...................................... 429/223
3,607,411  9/1971  Brownrigg .............................. 429/242
4,256,812  3/1981  Tamura et al. ............................ 429/56
4,463,070  7/1984  Affeldt ..................................... 429/194
5,185,221  2/1993  Rampel .................................... 429/59

*Primary Examiner*—Prince Willis, Jr.
*Assistant Examiner*—Carol Chaney
*Attorney, Agent, or Firm*—Weiser & Associates

[57] ABSTRACT

A button cell containing electrodes having a polygonal shape, preferably square or hexagonal, in a flat housing is advantageous when compared to such cells having conventional round pressed powder electrodes. The electrodes can be cut from a continuously manufactured rolled strip with a metallic web overlay without appreciable material waste. The webs of the electrodes face outwardly toward the top and bottom of the housing when the electrodes are fitted into the cell. The free space left between the electrode edges and the interior of the cylindrical cell housing is available as electrolyte collecting space and is advantageous for gas take-up.

19 Claims, 2 Drawing Sheets

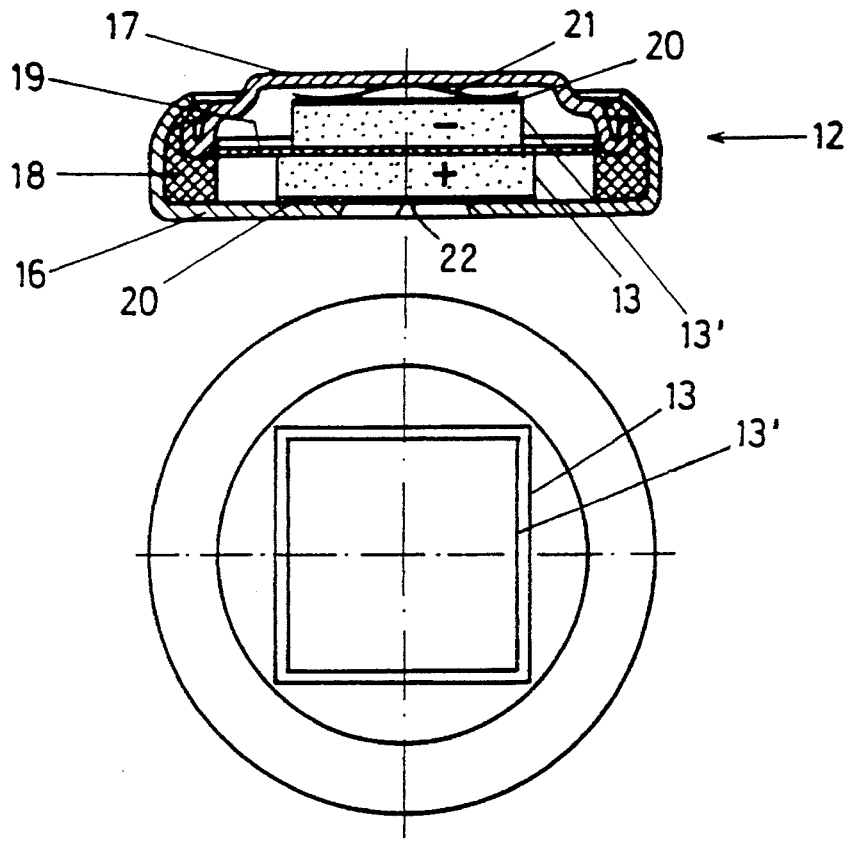
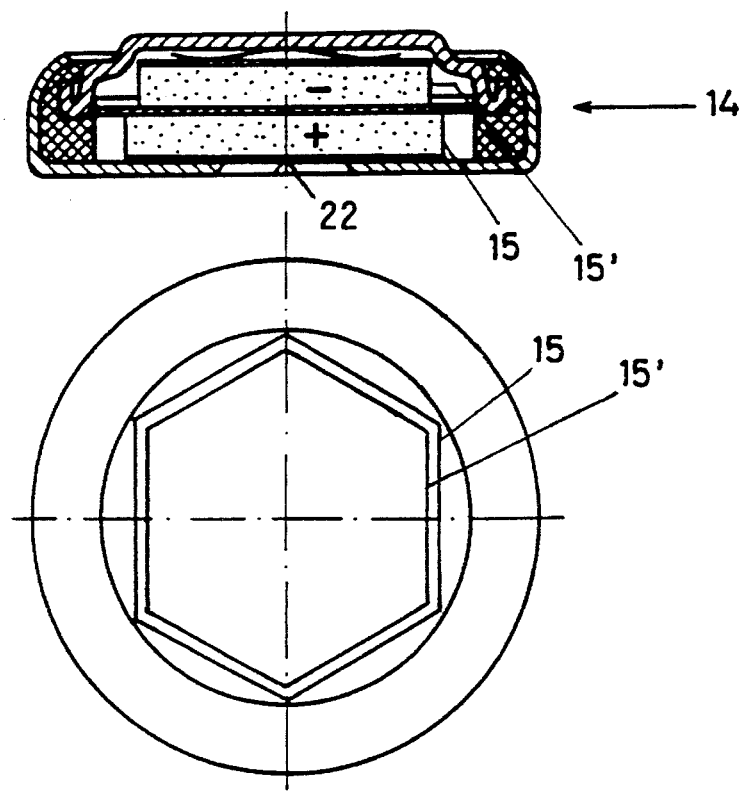

BUTTON CELL

BACKGROUND OF THE INVENTION

This invention relates to a button cell containing at least one positive electrode, one negative electrode and an interposed separator arranged one on top of the other in a flat gas-tight housing, and also an electrolyte.

Button cells conventionally comprise a housing cup and a lid which are both produced as punched and drawn parts from nickel-plated deep-drawn strip steel. Normally, the housing cup is positive in polarity and the lid is negative in polarity. Button cells of this construction may contain different electrochemical systems. Button cells with rechargeable Ni/Cd systems are very widespread. Recently, button cells with metal oxide/metal hydride systems, in particular Ni/Nickel hydride cells, have been acquiring increasing importance. In addition to these secondary systems, which also include secondary lithium systems, primary lithium systems and other high-energy systems such as silver oxide/zinc systems, are available in button-cell form.

At least the positive electrodes of many conventional button cells, and for alkaline Ni/Cd systems, also the negative electrodes, are mass electrodes in the form of pressed powder pellets enclosed in a fine-mesh pure-nickel wire web. A fine-pore separator composed of a plastic mat is arranged between the electrodes. A corrugated spring contact on the back of the negative electrode produces a defined compressive force on the plate group and consequently results in a uniform contact resistance between the electrodes and the housing.

The cells may be closed by flanging the rim of the cup over the lid. In this arrangement, a plastic ring is used, preferably simultaneously serving as a sealing ring and to insulate the cup from the lid.

The manufacture of pressed powder electrodes for button cells is laborious and generally unsuitable for an efficient production cycle, which is largely determined by automatic operations. The powder mass is first dispensed and pressed into a pellet. The pellet is then placed in an enclosure composed of a nickel wire web and covered with a small plate composed of the same web material. The enclosure is completed by wrapping a rim projecting beyond the pellet over the small cover plate. The electrode is then compressed (once again) by a pressure ram.

Because of the discontinuous sequence of these operations, this method is not only time-consuming, but also expensive due to the cost of the nickel wire netting, and because the nickel wire netting substantially exceeds the amount necessary for electrode reinforcement and for current collection.

SUMMARY OF THE INVENTION

It is therefore an object of the present invention to provide electrodes which can be produced in a more efficient way, for the assembly of standard button cells.

It is also an object of the present invention to provide electrodes for the efficient assembly of standard button cells in automated fashion.

It is also an object of the present invention to provide electrodes having the foregoing capabilities, and which are at least comparable in their electrical performance to known, round pressed powder pellet electrodes.

These and other objects are achieved in accordance with the present invention by providing the button cells with electrodes that are polygonal, instead of the more conventional, round electrodes. Preferably, the polygonal electrodes are square or hexagonal in shape. A particular advantage of these novel electrodes is that they can be cut into the desired shape from a rolled electrode strip which is in finished form, instead of being formed in the manner which is standard for round pressed powder pellets. Furthermore, even when compared with round electrodes which are cut from an endless strip, the polygonal electrodes of the present invention have the advantage that their shape permits a more complete utilization of the strip material (either virtually free of any cutting waste, or at least of greatly reduced waste). The continuous production of a rolled strip is also well suited to the automated manufacture of button cells.

The invention is explained in greater detail below, with reference to the following illustrations.

BRIEF DESCRIPTION OF THE DRAWINGS

FIG. 3a is a cross-sectional view of a button cell having square-shaped electrodes.

FIG. 3b is a top plan view of the button cell of FIG. 3a, with the cover removed to reveal internal construction.

FIG. 4a is a cross-sectional view of a button cell having hexagon-shaped electrodes.

FIG. 4b is a top plan view of the button cell of FIG. 4a, with the cover removed to reveal internal construction.

DETAILED DESCRIPTION OF PREFERRED EMBODIMENTS

Figure 1:
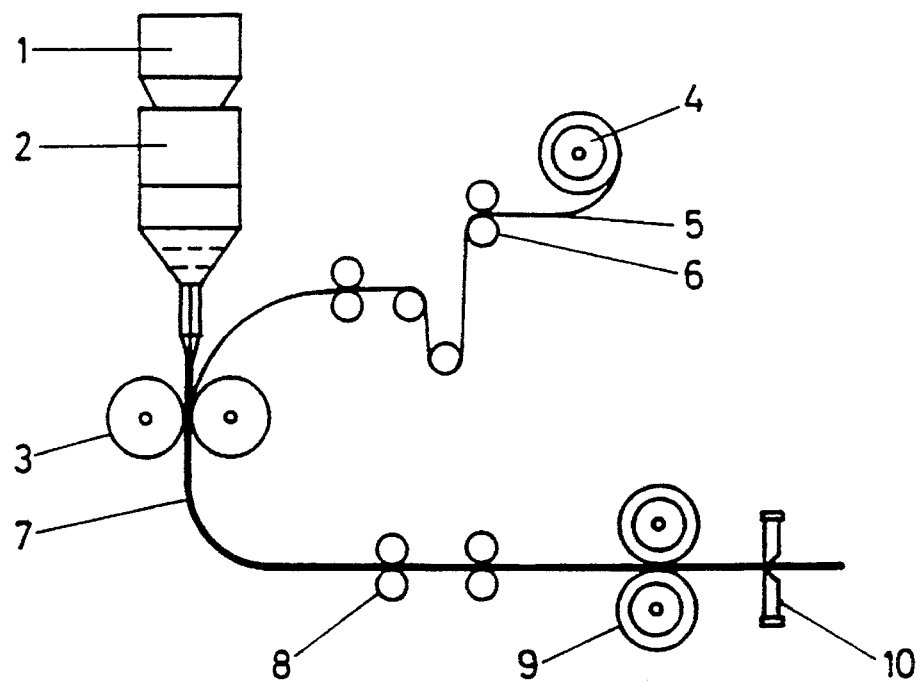
FIG. 1 is a schematic diagram showing manufacture of electrodes according to the present invention.

FIG. 1 schematically illustrates the manufacture of button cells incorporating the electrodes of the present invention. Initially, electrolytically active powder is fed from a feedstock container 1, via a feed hopper 2, between a pair of rollers 3 (of a rolling mill or calender). The rollers 3 compact the powder to form a rolled strip. Simultaneously, a carrier strip 5 is drawn between the rollers 3, together with the active powder mass. To this end, the strip 5 is advantageously stored on a coil 4, and drawn over guide rollers 6 for introduction between the rollers 3. The strip 5 is preferably composed of nickel, formed as a metal mesh or expanded metal, or a nickel-clad iron expanded metal web.

The resulting rolled strip 7, reinforced on one side by the strip 5, passes over additional guide rollers 8 and between cutting rollers 9 which separate the rolled strip 7 into segments of a desired length. The separated segments are then cut into single electrodes by a punching device 10.

Figure 2A:
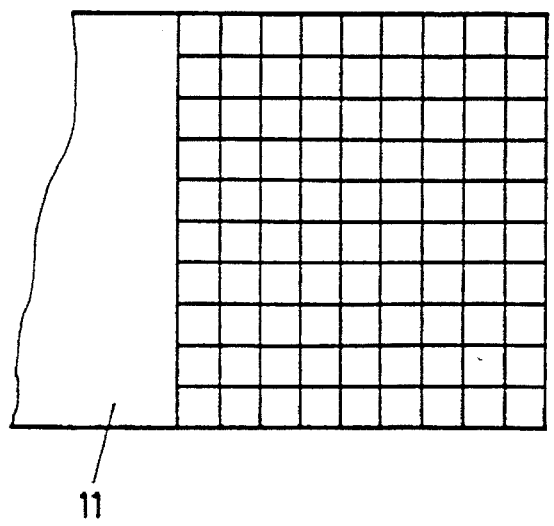
FIGS. 2a and 2b are plan views showing separation of the rolled strip into square-shaped or hexagon-shaped electrodes.
Figure 2B:
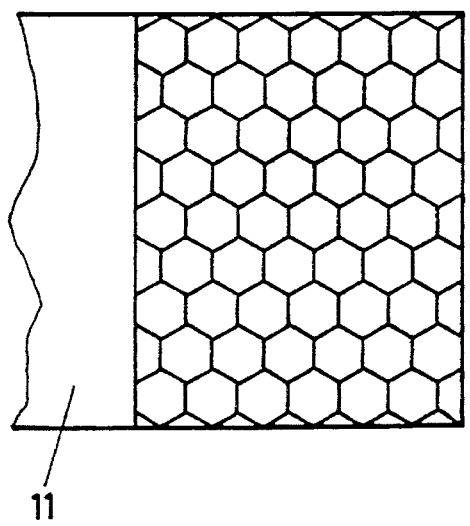

FIG. 2a shows the division of a rolled strip 11 into square electrodes (for example, having sides of 5.8 mm and an area of 33.6 mm$^2$). FIG. 2b shows the division of a rolled strip 11 into hexagonal electrodes (for example, having sides of 4.1 mm and an area of 43.6 mm$^2$). For the square electrodes, waste of the processed strip is virtually zero. For the hexagonal electrodes, a small cutting loss (on the order of 4.6%) will generally result from unusable edge regions.

In any event, it is apparent that electrodes which can be cut or punched from a rolled strip are extremely advantageous in relation to the material saved. On the other hand, a cutting process would be very inefficient if the rolled strip were to be divided into round electrodes of a similar size to the polygonal electrodes of the present invention. For example, in comparison to the hexagonal arrangement shown in FIG. 2b, the cutting waste for a round electrode would theoretically be 11%, but is in practice much higher for tooling reasons.

FIGS. 3a and 3b show a button cell 12 including square electrodes 13, 13'. FIGS. 4a and 4b show a button cell 14 including hexagonal electrodes 15, 15'. In each case, the electrodes are separated by a mat separator 19 and are mounted in a housing formed from a housing cup 16 and a lid 17, preferably with the inclusion of a sealing ring 18. As is preferred, the electrodes include metal net or expanded metal overlays 20 (i.e., the strip 5 previously described) which face outwardly (i.e., toward the housing parts). The negative electrode (13' or 15') additionally receives a contact spring 21 to produce the compressive forces necessary for proper operation of the cell.

In the plan views of FIGS. 3b and 4b, the electrodes (13, 13' or 15, 15') can in each case readily be recognized as squares or hexagons inscribed in the circular sealing ring 18. However, other polygonal shapes can be employed if desired.

Button cells according to the present invention may preferably be based on rechargeable Ni/Cd and Ni/metal hydride (Ni/MH) systems. In such cases, the cells are provided not only with an alkaline electrolyte but with a positive nickel hydroxide electrode and a negative cadmium electrode, or a negative electrode composed of an alloy metal capable of storing hydrogen. The invention may, however, also be advantageously applied to electrodes of primary and secondary lithium systems.

The voids between the round cell seal and the polygonal electrodes of the present invention have proved to be a very effective remedy for the problem of so-called "squeezing"(i.e., pressing out of excess electrolyte when pressure is exerted on the electrode assembly when Ni/MH button cells are closed, which may result in leakage) since free spaces are provided for receiving the electrolyte which is squeezed out. If round electrodes were used, such squeezing could only be accommodated by means such as an expanded metal inlay placed underneath the positive electrode.

The novel electrodes of the present invention also behave with mechanical stability toward the effects encountered in treating them with alkaline solution preceding assembly. Treatment with an alkaline solution is a standard step which includes decarbonatizing a negative cadmium mass (first precipitated as cadmium carbonate for reasons of better filterability) with a hot alkaline solution (i.e., reprecipitating the mass to form $Cd(OH)_2$). It has been found that the calendered electrodes of the present invention do not break off at their edges during decarbonatizing.

To improve gas take-up, the negative electrodes produced according to the present invention may advantageously be brought into contact with a material which catalyzes oxygen reduction. Such a material can be, for example, a mixture of active carbon, conductive carbon black and a hydrophobic binder. During the electrode production process, this mixture can either be rolled into the metal mesh or expanded metal carrier strip, before entering the calender together with the powder mass, or may later be rolled onto the rolled electrode strip, which is then in finished form. As a result of its direct, electron-conducting contact with the electrode, this layer functions as an auxiliary electrode having a virtually polarization-free surface serving as the preferred oxygen take-up point.

The button cells of the present invention can also include a safety valve in the form of a weakened point (shown at 22) which is introduced into the housing wall, and which serves as a predetermined breaking point which can burst in the event of an extremely high internal pressure, thus preventing the cell from bulging. Such weakened points are preferably groove-shaped recesses formed in the base of the housing cup (e.g., taking the form of a polarity symbol (+sign) or a company symbol).

The electrodes of the present invention have been used to make button cells which are at least equal, in terms of their capacity, to known button cells of identical shape and size, but fitted with conventional round electrodes in expensive mesh enclosures. As a result of their improved material utilization in relation to the consumption of metal-mesh netting, a cost savings of up to 50% is achieved with the electrodes of the present invention.

Experiments have further shown that specified capacities for button cells having round (rolled strip) electrodes are also fulfilled by cells made with square or hexagonal electrodes in accordance with the present invention. Yet, as discussed above, the polygonal electrodes of the present invention can be cut or punched from rolled strip materials with much less waste than round electrodes.

It will be understood that various changes in the details, materials and arrangement of parts which have been herein described and illustrated in order to explain the nature of this invention may be made by those skilled in the art within the principal and scope of the invention as expressed in the following claims.

What is claimed is:

1. A button cell comprising at least one positive electrode, at least one negative electrode and an interposed separator arranged one on top of another in a flat gas-tight housing, a carrier strip associated with the positive electrode and the negative electrode, and an electrolyte, wherein the electrodes have a polygonal shape.

2. The button cell of claim 1, wherein the electrodes have a square shape.

3. The button cell of claim 1, wherein the electrodes have a hexagonal shape.

4. The button cell of claim 1, wherein the positive electrode comprises nickel hydroxide and the electrolyte is an alkaline electrolyte.

5. The button cell of claim 4, wherein the negative electrode comprises cadmium.

6. The button cell of claim 4, wherein the negative electrode comprises an alloy metal capable of storing hydrogen.

7. The button cell of claim 1, further comprising a groove in the housing which serves as a breaking point.

8. The button cell of claim 1, wherein the carrier strip is a metal mesh web composed of nickel.

9. The button cell of claim 1, wherein the carrier strip is an expanded metal web composed of nickel or nickel-clad iron.

10. The button cell of claim 1, wherein the carrier strip faces outwardly toward the housing of the cell.

11. The button cell of claim 1, wherein the carrier strip further comprises a material which catalyzes oxygen reduction.

12. The button cell of claim 11, wherein the catalyzing material is a mixture composed of active carbon, conductive carbon black and a hydrophobic binder.

13. A button cell which includes at least one positive electrode, at least one negative electrode and an interposed separator arranged one on top of another in a flat gas-tight housing, a carrier strip associated with the positive electrode and the negative electrode, and an electrolyte, wherein the electrodes have a polygonal shape and are manufactured by cutting the polygonal electrodes from an electrode strip material.

14. A method of manufacturing a button cell which includes at least one positive electrode, at least one negative electrode and an interposed separator arranged one on top of another in a flat gas-tight housing, and an electrolyte, wherein the electrodes have a polygonal shape, and wherein the method comprises the steps of forming the positive electrode and the negative electrode from strip material formed by rolling together and compacting an electrolytically active powder and a carrier strip, and cutting the polygonal electrodes from the electrode strip material.

15. The method of claim 14, wherein the strip material is cut into squares.

16. The method of claim 14, wherein the strip material is cut into hexagons.

17. The method of claim 14, which further comprises the step of applying a material which catalyzes oxygen reduction to the strip material.

18. The method of claim 17, wherein the catalyzing material is applied to the carrier strip before the carrier strip and the active powder are rolled and compacted.

19. The method of claim 17, wherein the catalyzing material is applied to the rolled and compacted strip materials.

* * * * *